Feb. 15, 1966    B. E. STEVENS    3,235,785
FREQUENCY CHANGER
Filed Nov. 20, 1961
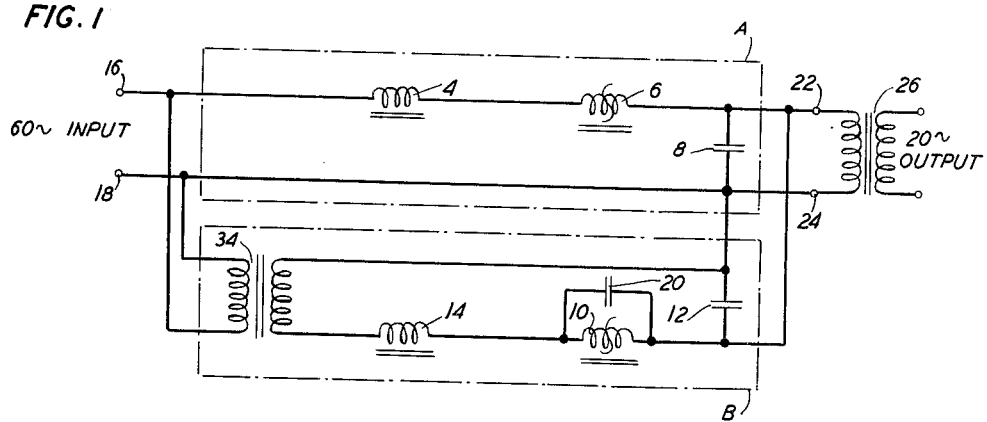
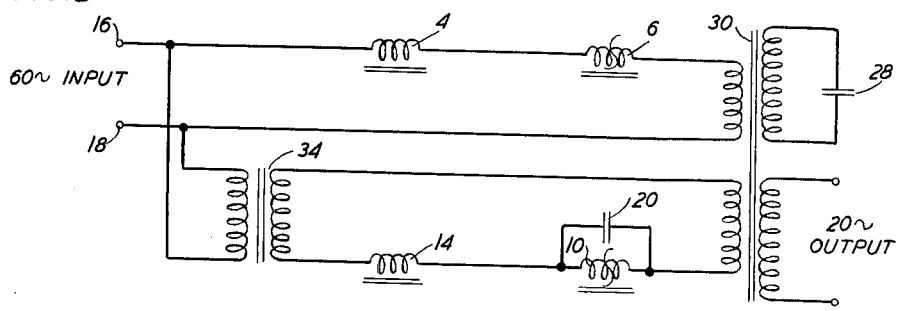
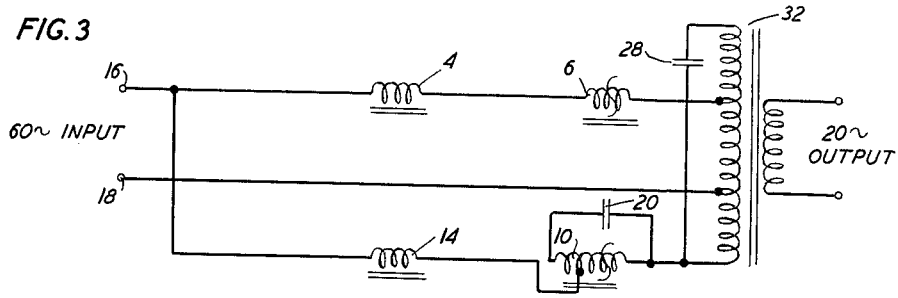
INVENTOR
B.E. STEVENS
BY V. P. Priolo
ATTORNEY United States Patent Office 3,235,785
Patented Feb. 15, 1966

3,235,785
FREQUENCY CHANGER
Bruce E. Stevens, Closter, N.J., assignor to Bell Telephone Laboratories, Incorporated, New York, N.Y., a corporation of New York
Filed Nov. 20, 1961, Ser. No. 153,469
1 Claim. (Cl. 321—69)

This invention relates to frequency changers and more particularly to means for transforming the frequency of an alternating current source.

An object of the invention, which makes use of the well-known nonlinear properties of magentic coils, is to provide a reliable, efficient, self-starting, self-maintaining subfrequency generator calling for no mechanical switch or other special shock producing device to initiate the generation of said subfrequency.

This objective is achieved by combining the basic Fallou subharmonic generator and an auxiliary self-starting exciting circuit. The Fallou circuit, per se, has a number of advantages over other magnetic type subharmonic generators. It is comparatively simple and efficient. It has good output wave form and can be made to have excellent output voltage regulation. However, it is not self-starting. The present invention provides a self-starting subharmonic generator having the desirable characteristics of the Fallou circuit.

The nature of the invention and its distinguishing features and advantages will be more clearly understood from the following detailed description and the accompanying drawings in which:

FIG. 1 is a circuit schematic of a frequency changer embodying the basic structure of the invention.

FIG. 2 is a modification of FIG. 1 showing an output transformer with a common capacitor, and FIG. 3 is another modification of FIG. 1 showing an autotransformer arrangement for the primary side of the output transformer and the omission of the input transformer.

In FIG. 1, that portion of the circuit which is bracketed by dash lines A is the well-known Fallou circuit disclosed in Patent 1,633,481 granted to J. G. Fallou on June 21, 1927. This circuit, which comprises linear inductor 4, nonlinear inductor 6 and output capacitor 8 serially coupled between input terminals 16 and 18 and energized from a 60 c.p.s. source which is connected across input terminals 16 and 18, normally has a very large series impedance and, therefore, permits little current flow. However, if a momentary 20 c.p.s. voltage of suitable value is applied across capacitor 8, the circuit will start and will actively produce 20 c.p.s. at its output. The output of the auxiliary self-starting circuit, which is bracketed by dash lines B, is used for this purpose. By virtue of its high output impedance, it is not necessary to disconnect the auxiliary circuit once the Fallou circuit is driven into operation. The division of load carrying capacity between the Fallou and auxiliary portions of the circuit may be advantageous provided the desirable characteristics of the Fallou circuit are allowed to predominate.

The auxiliary self-starting circuit comprises a nonlinear inductor 10, a capacitor 12 and a linear inductor 14 connected effectively in series across the input terminals 16 and 18 and effectively in shunting relationship with nonlinear inductor 6 of the Fallou circuit with respect to the input terminals 16 and 18; and a second capacitor 20 shunting the nonlinear inductor 10. The 20 c.p.s. output voltage which appears across capacitor 12 is applied across capacitor 8.

The nonlinear inductor 10 and capacitor 20 in parallel therewith form a parallel resonant circuit which is resonant at 100 c.p.s. when the nonlinear inductor 10 is in its average saturated condition. The nonlinear inductor 10, the linear inductor 14 and the capacitor 12, connected in series, form a resonant circuit tuned to 20 c.p.s. when the nonlinear inductor 10 is in its average saturated condition. Each of the inductors may comprise a coil having a toroidal magnetic core made of rings of laminated silicon steel, the core of inductor 14 having a large air gap to provide the desired linearity of inductance up to high circuit currents; the core of inductor 10 being of a composite structure including three rings, the center ring having a gap and the outer rings being gapless to provide the desired nonlinear inductance characteristic.

It is essential that the magnitude of the voltage across capacitor 12 be approximately the same as the magnitude of the voltage at output terminals 22 and 24 once the Fallou circuit has started. This can be assured by properly defining the values of the inductors and capacitors included in the auxiliary circuit. For example, with linear inductor 14 having an inductance of approximately 3.0 henries, nonlinear inductor (saturating inductor) 10 having a peak inductance of approximately 40.0 henries at or below 0.012 ampere, 12.0 henries at 0.050 ampere and in order of 1.2 henries at currents greater than a few tenths of an ampere, capacitor 20 having a value of approximately 2 μf. and capacitor 12 having a value of approximately 16 μf., the auxiliary circuit will self-start, operate and provide a voltage of suitable value across capacitor 12 when power from the 60 c.p.s. source is applied thereto.

Below an input of 75 to 80 volts to step-up transformer 34 the current flowing in the auxiliary generator circuit will be practically sinusoidal at 60 c.p.s. since inductor 10 will be operating in its linear range. Above that voltage it will be nonsinusoidal because inductor 10 will be operating in its nonlinear (saturated) range, and at about 90 volts input the circuit falls readily into its normal operating mode in which a strong steady 20 c.p.s. component appears across capacitor 12. This component is considerably greater than the 60 c.p.s. component caused by line current flowing through the same circuit element from the 60 c.p.s. power source. Twenty-cycle production will continue under load provided the load resistor is not so low as to reduce the effective "Q" of the capacitor 12 to the point at which the circuit can no longer maintain oscillation.

During the steady state operation (normal operating mode), the line current contains strong components of both 20 and 100 c.p.s. in such fixed phase relation to the 60 c.p.s. "fundental" that they combine to produce sharp peaks of opposite polarity at every third half-cycle of the fundamental current wave, or one peak in each direction during every 20-cycle period. These peaks strongly excite the two resonant circuits tuned to 20 and 100 c.p.s., respectively, to produce the necessary wave shape to maintain these circuits oscillating, the resonant circuits themselves exercising the control to keep the process going, once started.

When the 20 c.p.s. output voltage appearing across capacitor 12 is applied to capacitor 8, operation of the Fallou circuit will start. The circuit will then actively produce a 20 c.p.s. voltage at its output terminals 22 and 24. If an output transformer 26 is connected across terminals 22 and 24 and is made to operate well above the knee of its magnetization curve, an automatic means is provided for voltage regulation. When the output voltage tends to decrease because of load or input voltage change, the magnetizing current of the output transformer decreases rapidly, and accordingly the effective inductance of the primary winding in shunt with capacitor 8 increases. As a result, much less cancellation of the capacitance of capacitor 8 occurs. In other words, the Fallou circuit has a larger effective capacitance as the output voltage tends to drop, and regulation is thereby attained.

The embodiments shown in FIGS. 2 and 3 are commercial adaptations of the basic embodiment shown in FIG. 1. These embodiments employ a common capacitor 28 which combines the functions of capacitors 12 and 8, and transformers 30 and 32, respectively, which provide metallic isolation between the power source and the load and boost the voltage to a value at which commercially available capacitors are rated. The embodiment shown in FIG. 2 employs a step-up input transformer 34, as does the embodiment shown in FIG. 1. In the embodiment shown in FIG. 3, the omission of the input transformer and the use of autotransformer 32 provide a more efficient and economical arrangement since it is possible to employ less transformer turns to provide results equivalent to those obtained by the embodiment shown in FIG. 2.

It is to be understood that the above-described arrangements are illustrative of the application of the principles of the invention. Other arrangements may be devised by those skilled in the art without departing from the spirit and scope of the invention.

What is claimed is:

Apparatus for producing across an output thereof an alternating current of a first frequency which is a subharmonic of an alternating current of a second frequency applied to the input thereof, comprising first and second subharmonic generators coupled in shunting relationship to said input, said first and second generators including in common a first capacitor and a transformer having a first winding coupled across said output and a second winding having multiple taps, said first capacitor being coupled across said second winding, said first subharmonic generator additionally including a first saturating inductive element connected serially between a first tap on said second winding and a first terminal of said input for resonating with said first capacitor at said first frequency, said second subharmonic generator additionally including a second saturating inductive element and a linear inductive element connected serially with said second saturating element between a second tap on said second winding and said first input terminal for resonating with said first capacitor at said first frequency, a second capacitor connected across said second saturating element for resonating with said second saturating element at a third frequency which excites said first frequency in said second saturating element, and means for connecting a third tap located between said first and second taps on said second winding to a second terminal of said input.

References Cited by the Examiner
UNITED STATES PATENTS

| | | | |
|---|---|---|---|
| 2,418,640 | 4/1947 | Huge | 321—68 |
| 2,462,322 | 2/1949 | Huge | 321—69 |
| 2,611,119 | 9/1952 | McCreary | 321—68 |

LLOYD McCOLLUM, *Primary Examiner.*